United States Patent
Hong

(10) Patent No.: US 11,632,698 B2
(45) Date of Patent: Apr. 18, 2023

(54) METHOD AND APPARATUS FOR RECOGNIZING UNMANNED AERIAL VEHICLE, AND MOBILITY MANAGEMENT ENTITY AND BASE STATION

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 287 days.

(21) Appl. No.: 16/822,432

(22) Filed: Mar. 18, 2020

(65) Prior Publication Data

US 2020/0221355 A1  Jul. 9, 2020

Related U.S. Application Data

(63) Continuation of application No. PCT/CN2017/102273, filed on Sep. 19, 2017.

(51) Int. Cl.
*H04W 4/00* (2018.01)
*H04W 36/00* (2009.01)
(Continued)

(52) U.S. Cl.
CPC ....... *H04W 36/0058* (2018.08); *B64C 39/024* (2013.01); *H04W 8/08* (2013.01);
(Continued)

(58) Field of Classification Search
CPC ..... H04W 8/08; H04W 8/24; H04W 36/0005; H04W 36/0011; H04W 36/0058;
(Continued)

(56) References Cited

U.S. PATENT DOCUMENTS

2014/0051445 A1*  2/2014  Vikberg ............. H04L 67/2847
                                                                   455/436
2015/0142211 A1     5/2015  Shehata et al.
(Continued)

FOREIGN PATENT DOCUMENTS

CN  102469543 A  5/2012
CN  103686695 A  3/2014
(Continued)

OTHER PUBLICATIONS

Examination Report of Indian Application No. 202047016511, dated Nov. 3, 2021.
(Continued)

*Primary Examiner* — Matthew W Genack
(74) *Attorney, Agent, or Firm* — Finnegan, Henderson, Farabow, Garrett & Dunner, L.L.P.

(57) ABSTRACT

A method for recognizing an unmanned aerial vehicle, applied to a source base station, includes: determining a target base station to which user equipment (UE) is to be handed over and a handover mode of the UE based on a measurement report reported by the UE; determining second signaling based on first signaling corresponding to the handover mode, the first signaling being signaling for requesting handover sent by the source base station, and the second signaling including indication information indicating that the UE requesting handover is a UAV; and sending the second signaling.

16 Claims, 16 Drawing Sheets

(51) Int. Cl.
  *H04W 76/27*   (2018.01)
  *B64C 39/02*   (2023.01)
  *H04W 8/08*    (2009.01)
  *H04W 8/24*    (2009.01)
  *H04W 36/08*   (2009.01)

(52) U.S. Cl.
  CPC ......... *H04W 8/24* (2013.01); *H04W 36/0094* (2013.01); *H04W 36/08* (2013.01); *H04W 76/27* (2018.02)

(58) Field of Classification Search
  CPC ......... H04W 36/0085; H04W 36/0088; H04W 36/0094; H04W 36/08; H04W 76/20; H04W 76/27; B64C 39/024; B64C 2201/00; B64C 2201/12
  See application file for complete search history.

(56) References Cited

U.S. PATENT DOCUMENTS

| | | | | |
|---|---|---|---|---|
| 2018/0115928 | A1* | 4/2018 | Kim | H04W 36/14 |
| 2018/0324662 | A1* | 11/2018 | Phuyal | H04B 7/18504 |
| 2020/0236602 | A1* | 7/2020 | Mahkonen | H04B 7/18504 |

FOREIGN PATENT DOCUMENTS

| | | |
|---|---|---|
| CN | 104994551 A | 10/2015 |
| CN | 105657861 A | 6/2016 |
| CN | 108401520 A | 8/2018 |
| EP | 3 032 368 A1 | 6/2016 |

OTHER PUBLICATIONS

Second Office Action of Chinese Application No. 201780001434.5, dated Jul. 7, 2021.

International Search Report in the International Application No. PCT/CN2017/102273, dated May 28, 2018.

English translation of the Written Opinion of the International Search Authority in the International Application No. PCT/CN2017/102273, dated May 28, 2018.

3rd Generation Partnership Project; Technical Specification Group Radio Access Network; Evolved Universal Terrestrial Radio Access Network (E-UTRAN); X2 application protocol (X2AP) (Release 14), 3GPP TS 36.423, V14.3.0, Jun. 25, 2017, 242 pages.

3rd Generation Partnership Project; Technical Specification Group Radio Access Network; Study on Enhanced LTE Support for Aerial Vehicles (Release 15), 3GPP TR 36.777, V0.2.0, Aug. 27, 2017, 16 pages.

NTT Docomo et al., Measurements Reporting Enhancements for UAV UE, 3GPP TSG-RAN2#99, R2-1709396, Aug. 21-25, 2017, Berlin, Germany, 10 pages.

ZTE, S1/X2 Signaling Support of UAV Subscription information, 3GPP TSG-RAN WG3#99bis, R3-181664, Apr. 16-20, 2018, Sanya, China, 8 pages.

Supplementary European Search Report in the European Application No. 17926123.5, dated Aug. 26, 2020.

3GPP TSGRAN, Evolved Universal Terrestrial Radio Access Network (E-UTRAN); X2 application protocol (X2AP) (Release 13), 3GPP TS 36.423 V13.7.0, Jun. 30, 2017, 239 pages.

* cited by examiner

METHOD AND APPARATUS FOR RECOGNIZING UNMANNED AERIAL VEHICLE, AND MOBILITY MANAGEMENT ENTITY AND BASE STATION

CROSS-REFERENCE TO RELATED APPLICATION

This application is a continuation of International Application No. PCT/CN2017/102273 filed on Sep. 19, 2017, the content of which is incorporated herein by reference in its entirety.

TECHNICAL FIELD

The present disclosure relates to the technical field of wireless communication, and more particularly, to a method and apparatus for recognizing an Unmanned Aerial Vehicle (UAV), a Mobility Management Entity (MME) and a base station.

BACKGROUND

An unmanned aerial vehicle (UAV) has been applied to some specific scenarios to execute tasks such as high-altitude photographing, unmanned detection and reconnaissance, surveying and mapping, highway surveying, urban planning, ecological environmental protection monitoring, scientific investigation, oil exploration, aerial remote sensing, frontier patrolling, forest fire protection, disaster assessment and the like.

For further extending an application range of the UAV, the 3rd Generation Partnership Project (3GPP) proposes researches on provision of more standard service meeting a requirement for the UAV in a cellular network in discussions about the project "enhanced support of UAVs." For providing service meeting the requirement for the UAV, a base station is required to get ready to recognize whether a device is a UAV when the device requests handover or requests access.

SUMMARY

According to a first aspect of embodiments of the present disclosure, a method for recognizing a UAV, applied to a source base station, includes: determining a target base station to which user equipment (UE) is to be handed over and a handover mode of the UE based on a measurement report reported by the UE; determining second signaling based on first signaling corresponding to the handover mode, the first signaling being signaling for requesting handover sent by the source base station, and the second signaling including indication information indicating that the UE requesting handover is a UAV; and sending the second signaling.

According to a second aspect of embodiments of the present disclosure, a method for recognizing a UAV, applied to a Mobility Management Entity (MME), includes: receiving second signaling sent by a source base station; determining, when it is determined based on the second signaling that user equipment (UE) requesting handover is a UAV, third signaling to be sent to a target base station based on original handover request signaling to be sent to the target base station by the MME, wherein the third signaling includes indication information indicating that the UE requesting handover is the UAV; and sending the third signaling to the target base station.

According to a third aspect of embodiments of the present disclosure, an apparatus for recognizing a UAV, applied to a source base station, includes: a processor; and a memory for storing instructions executable by the processor; wherein the processor is configured to: determine a target base station to which UE is to be handed over and a handover mode of the UE based on a measurement report reported by the UE; determine second signaling based on first signaling corresponding to the determined handover mode, wherein the first signaling is signaling for requesting handover sent by the source base station, and the second signaling includes indication information indicating that the UE requesting handover is a UAV; and send the second signaling.

According to a fourth aspect of embodiments of the present disclosure, an apparatus for recognizing a UAV, applied to an MME, includes: a processor; and a memory for storing instructions executable by the processor; wherein the processor is configured to: receive second signaling sent by a source base station; when it is determined based on the received second signaling that UE requesting handover is a UAV, determine third signaling to be sent to a target base station based on original handover request signaling to be sent to the target base station by the MME, wherein the third signaling includes indication information indicating that the UE requesting handover is the UAV; and send the third signaling to the target base station.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

In the present disclosure, an unmanned aerial vehicle (UAV) may be a cellular-network-based UAV accessing a cellular network.

Figure 1A:
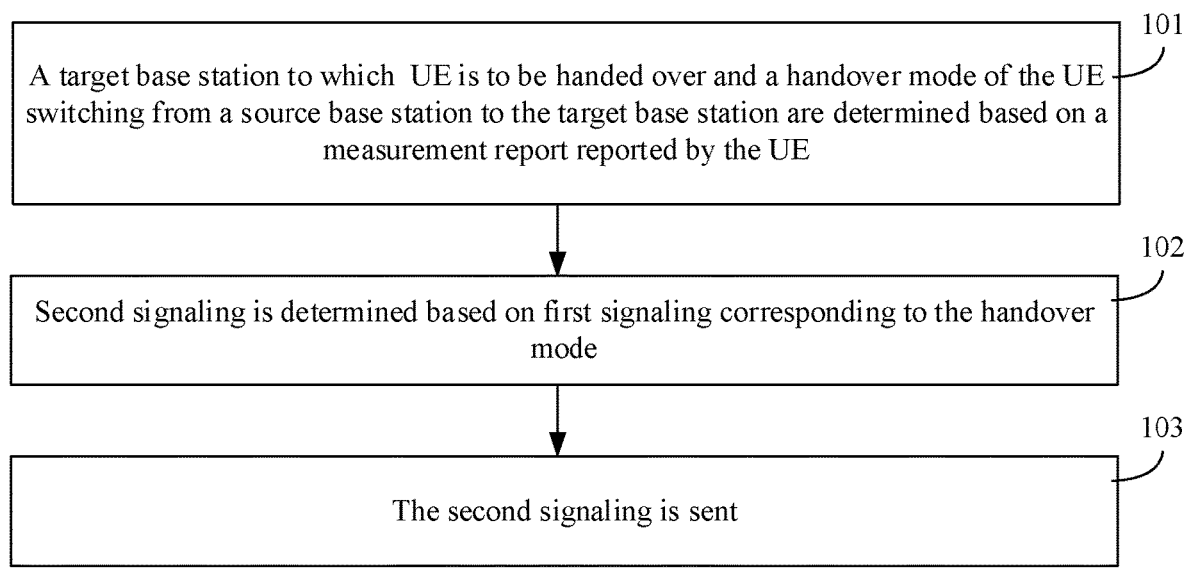
FIG. 1A is a flow chart showing a method for recognizing a UAV, according to an exemplary embodiment.
Figure 1B:
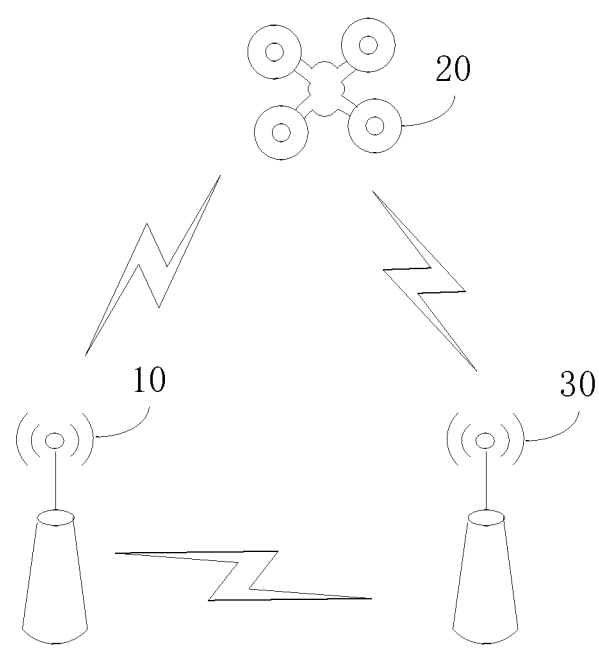
FIG. 1B is a first scenario diagram of a method for recognizing a UAV, according to an exemplary embodiment.
Figure 1C:
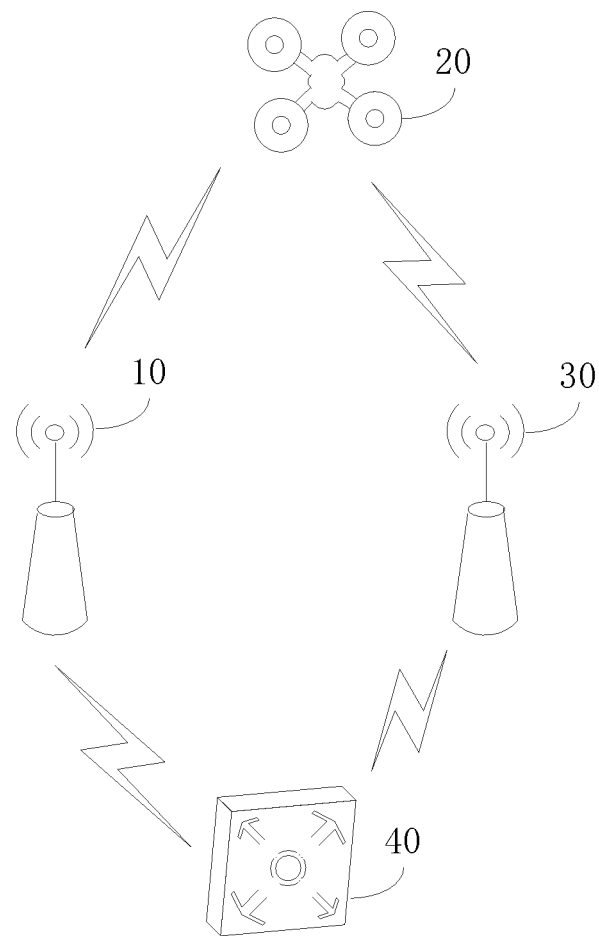
FIG. 1C is a second scenario diagram of a method for recognizing a UAV, according to an exemplary embodiment.

FIG. 1A is a flow chart showing a method for recognizing a UAV, according to an exemplary embodiment. FIG. 1B is a first scenario diagram of the method for recognizing a UAV, according to an exemplary embodiment. FIG. 1C is a second scenario diagram of the method for recognizing a UAV, according to an exemplary embodiment. The method for recognizing a UAV can be applied to a base station, such as an Evolved Node B (eNB). As illustrated in FIG. 1A, the method for recognizing a UAV includes the following steps.

In step 101, a target base station to which user equipment (UE) is to be handed over and a handover mode of the UE switching from the source base station to the target base station are determined based on a measurement report reported by the UE.

In an embodiment, the source base station can perform measurement configuration on a UAV, and the source base station performs handover judgment with reference to a measurement result reported by the UAV according to its own handover algorithm to determine the target base station for handover.

In an embodiment, the source base station determines the handover mode based on whether there is an X2 interface between it and the target base station. If there is the X2 interface between the source base station and the target base station, the handover mode is X2-based handover; and if there is no X2 interface between the source base station and the target base station, the handover mode is handover based on an S1 interface between a base station and a packet core network.

In step 102, second signaling is determined based on first signaling corresponding to the handover mode.

In an embodiment, the first signaling is signaling for requesting handover sent from the source base station. For example, if the handover mode is X2-interface-based handover, the first signaling is handover request signaling in related art; and if the handover mode is S1-interface-based handover, the first signaling is handover required signaling in related art.

In an embodiment, the second signaling includes indication information for indicating that the UE requesting handover is the UAV.

In an embodiment, multiple manners are adopted to determine the second signaling based on the first signaling corresponding to the handover mode, as illustrated below in FIG. 2 and FIG. 3.

In step 103, the second signaling is sent.

In an embodiment, if the handover mode is X2-interface-based handover, the second signaling is sent to the target base station; and if the handover mode is S1-interface-based handover, the second signaling is sent to a Mobility Management Entity (MME).

In an exemplary scenario, as illustrated in FIG. 1B, there are provided a source base station 10, a UAV 20 and a target base station 30. After the source base station 10 determines the target base station 30 for handover based on a measurement report of the UAV 20, the source base station 10 can generate second signaling including indication information, which indicates that the UE requesting handover is the UAV based on original handover request signaling, and send it to the target base station 30. In such a manner, the source base station 10 transmits the indication information which indicates that the UE requesting handover is the UAV to the target base station 30, and the target base station 30 can configure service meeting a UAV's requirement for the UAV 20 based on the indication information.

In another exemplary scenario, as illustrated in FIG. 1C, there are provided the source base station 10, the UAV 20, the target base station 30 and an MME 40. After the source base station 10 determines the target base station 30 for handover based on a measurement report of the UAV 20, the source base station 10 can generate second signaling including the indication information, which indicates that the UE requesting handover is the UAV based on original handover request signaling, and send it to the MME 40. In such a manner, the source base station 10 transmits the indication information indicating that the UE requesting handover is the UAV to the MME 40, then the MME 40 transmits the indication information indicating that the UE requesting handover is the UAV to the target base station 30 through signaling, and the target base station 30 can configure service meeting a UAV's requirement for the UAV 20 based on the indication information.

In the embodiment, through step 101 to step 103, transmission of the indication information indicating that the UE requesting handover is the UAV to the target base station by the source base station is implemented to solve the problem in the related art that the target base station may not recognize the UAV during handover of the UAV and then may not provide service meeting a UAV's requirement.

Figure 2:
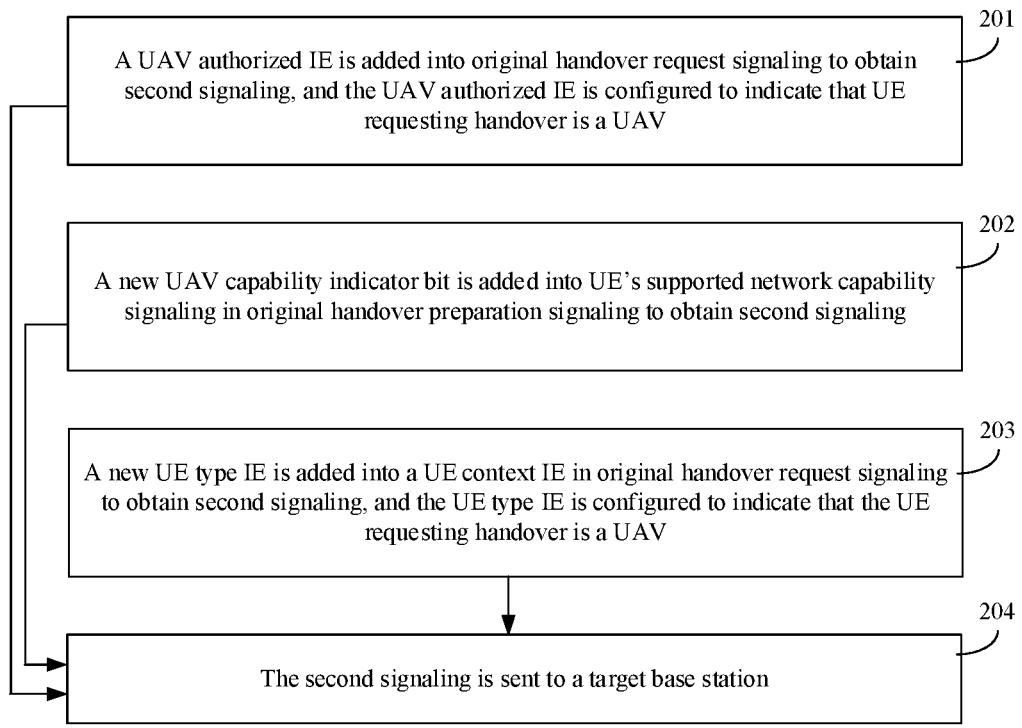
FIG. 2 is a flow chart showing a method for recognizing a UAV, according to an exemplary embodiment.

FIG. 2 is a flow chart showing a method for recognizing a UAV, according to an exemplary embodiment. In the embodiment, it is assumed that indication information indicating that UE requesting handover is a UAV is transmitted during X2-interface-based handover. As illustrated in FIG. 2, the following steps are included.

In step 201, information element (IE) authorized by the UAV, also referred to as the UAV authorized IE, is added into original handover request signaling to obtain second signaling, and the UAV authorized IE is configured to indicate that the UE requesting handover is the UAV, and step 204 is executed.

In an embodiment, the UAV authorized IE can be added into the handover request signaling, and the UAV authorized IE is configured to indicate that the UE requesting handover is the UAV.

In an embodiment, if the UE requesting handover is not a UAV, the UAV authorized IE is not added into the handover request signaling.

In step 202, a new UAV capability indicator bit is added into UE's supported network capability signaling in original handover preparation signaling to obtain second signaling, and step 204 is executed.

In an embodiment, the handover preparation signaling is in a Radio Resource Control (RRC) context IE of the handover request signaling.

In an embodiment, the cellular network is an Evolved Universal Terrestrial Radio Access (EUTRA) network, and the new UAV capability indicator bit can be added into the UE-EUTRA-capability signaling in the original handover preparation signaling, and the UAV capability indicator bit is configured to indicate that the UE requesting handover is the UAV.

In step 203, a new UE type IE is added into a UE context IE in original handover request signaling to obtain second signaling, and the UE type IE is configured to indicate that the UE requesting handover is the UAV, and step 204 is executed.

In an embodiment, the new UE type IE is added into the UE context IE in the original handover request signaling.

In step 204, the second signaling is sent to a target base station.

In the embodiment, a manner for transmitting the indication information indicating that the UE requesting handover is the UAV is provided. When a handover mode is X2-based handover, a new IE can be added in the handover request signaling or an indicator bit can be added into the UE-EUTRA-capability signaling, to indicate that the UE to be handed over is the UAV. Therefore, transmission of the indication information indicating that the UE requesting handover is the UAV to the target base station by the source base station is implemented.

Figure 3:
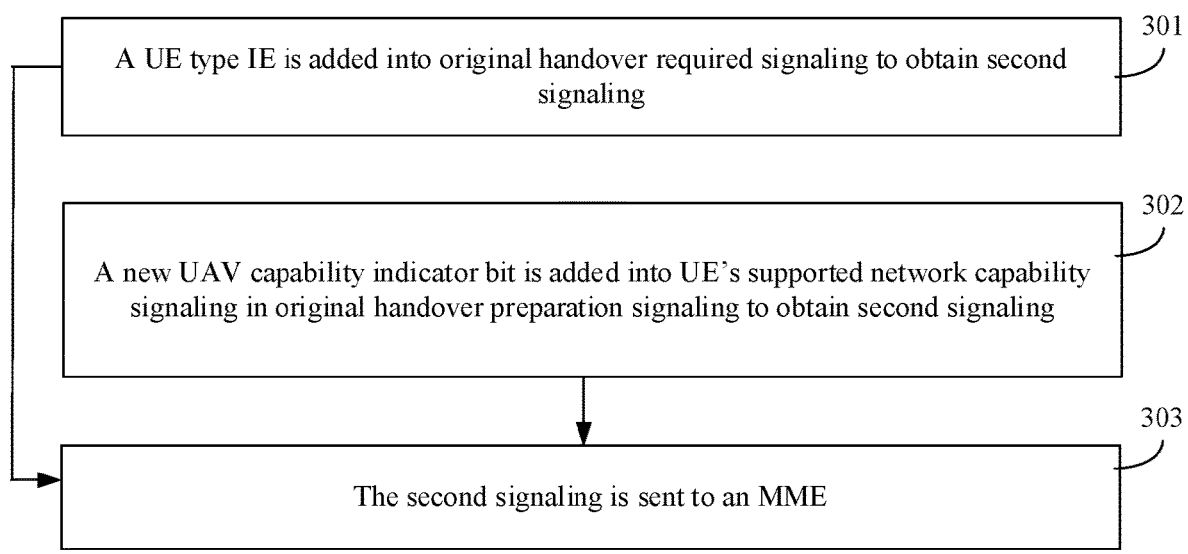
FIG. 3 is a flow chart showing a method for recognizing a UAV, according to an exemplary embodiment.

FIG. 3 is a flow chart showing a method for recognizing a UAV, according to an exemplary embodiment. In the embodiment, it is assumed that indication information indicating that UE requesting handover is a UAV is transmitted during S1-interface-based handover. As illustrated in FIG. 3, the following steps are included.

In step 301, a UE type IE is added into original handover request signaling to obtain second signaling, and step 303 is executed.

In an embodiment, a new UE type IE can be added into the handover request signaling, and the UE type IE is configured to indicate that the UE requesting handover is the UAV.

In step 302, a new UAV capability indicator bit is added into UE' supported network capability signaling in original handover preparation signaling to obtain second signaling, and step 303 is executed.

In an embodiment, the UAV capability indicator bit is configured to indicate that the UE requesting handover is the UAV, and the handover preparation signaling is in a source to target transparent container IE of the handover request signaling.

In step 303, the second signaling is sent to an MME.

In the embodiment, a manner for transmitting the indication information indicating that the UE requesting handover is the UAV is provided. When a handover mode is S1-based handover, a new IE can be designed in the handover request signaling or an indicator bit can be added into the UE' supported network capability signaling, such as the UE-EUTRA-capability signaling, to indicate that the UE to be handed over is the UAV to the MME, for the MME to further indicate it to the target base station. Therefore, transmission of the indication information indicating that the UE requesting handover is the UAV to the target base station by the source base station is implemented.

Figure 4A:
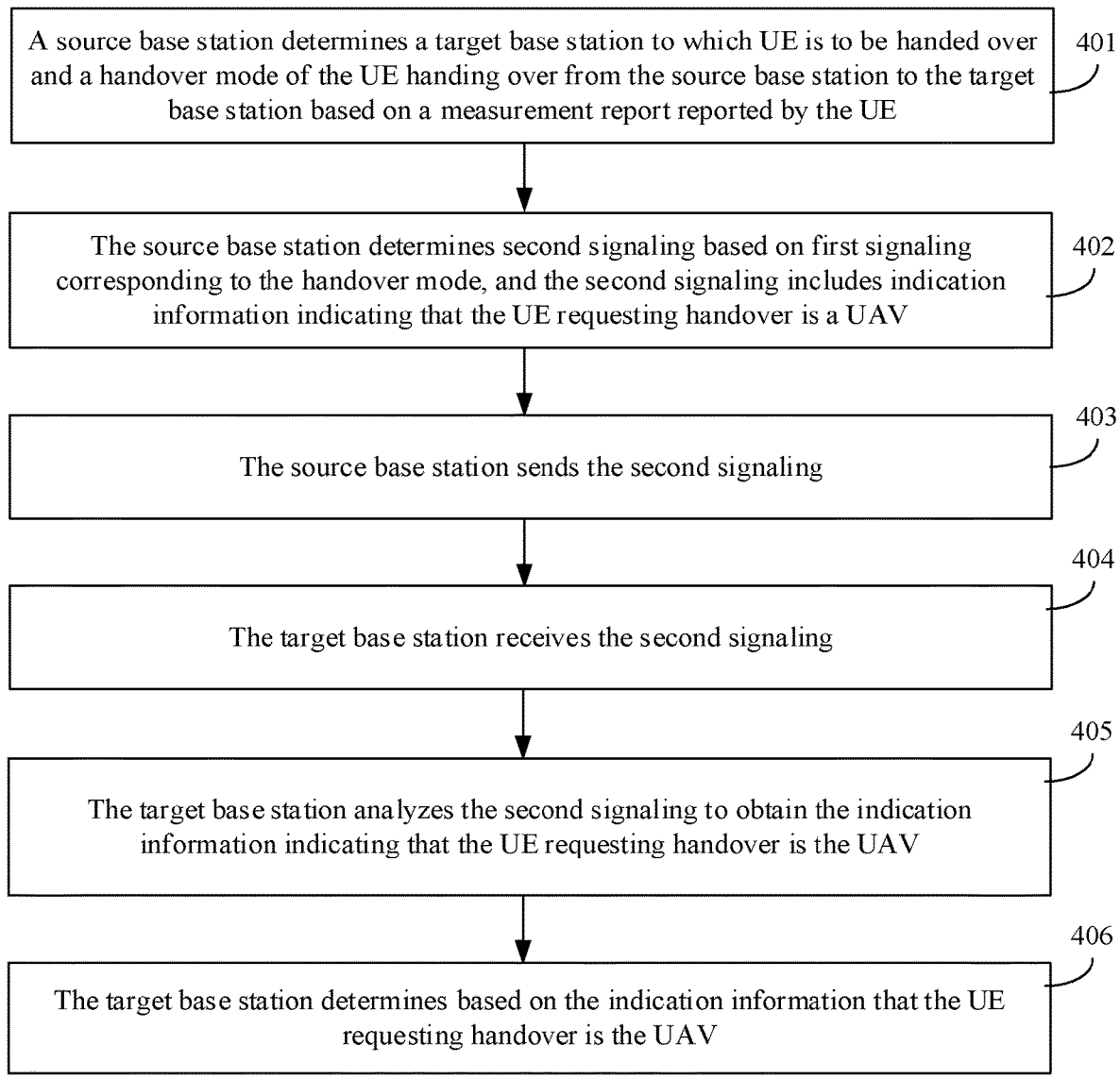
FIG. 4A is a first flow chart showing interaction between communication entities in a method for recognizing a UAV, according to an exemplary embodiment.
Figure 4B:
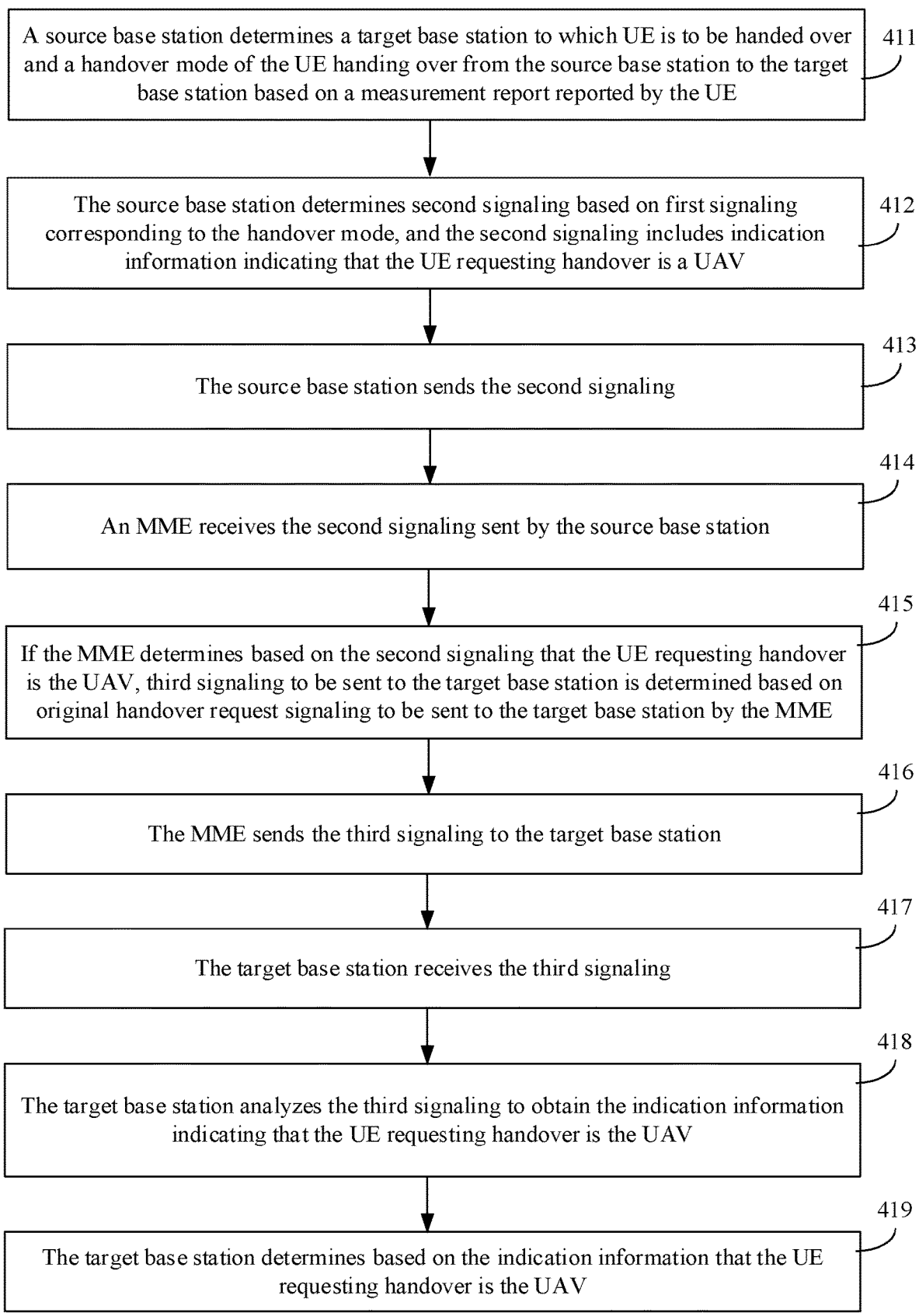
FIG. 4B is a second flow chart showing interaction between communication entities in a method for recognizing a UAV, according to an exemplary embodiment.

FIG. 4A is a first flow chart showing interaction between communication entities in a method for recognizing a UAV, according to an exemplary embodiment. FIG. 4B is a second flow chart showing interaction between communication entities in another method for recognizing a UAV, according to an exemplary embodiment. In the embodiments, the communication entities interact to enable a target base station to determine that UE requesting handover is a UAV As illustrated in FIG. 4A, an interaction flow of a source base station and the target base station during X2-interface-based handover includes the following steps.

In step 401, the source base station determines the target base station to which the UE is to be handed over and a handover mode of the UE handing over from the source base station to the target base station based on a measurement report reported by the UE.

In step 402, the source base station determines second signaling based on first signaling corresponding to the handover mode, and the second signaling includes indication information indicating that the UE requesting handover is a UAV.

In step 403, the source base station sends the second signaling.

Step 402 and step 403 are similar to step 201 to step 204 (FIG. 2).

In step 404, the target base station receives the second signaling.

In step 405, the target base station analyzes the second signaling to obtain the indication information indicating that the UE requesting handover is the UAV.

In step 406, the target base station determines based on the indication information that the UE requesting handover is the UAV.

As illustrated in FIG. 4B, an interaction flow of a source base station, an MME and a target base station during S1-interface-based handover includes the following steps.

In step 411, the source base station determines the target base station to which the UE is to be handed over and a handover mode of the UE handing over from the source base station to the target base station based on a measurement report reported by the UE.

In step 412, the source base station determines second signaling based on first signaling corresponding to the handover mode, and the second signaling includes indication information indicating that the UE requesting handover is a UAV.

In step 413, the source base station sends the second signaling.

Step 412 and step 413 are similar to step 301 to step 303 (FIG. 3).

In step 414, the MME receives the second signaling sent by the source base station.

In step 415, if the MME determines based on the second signaling that the UE requesting handover is the UAV, third signaling to be sent to the target base station is determined based on original handover request signaling to be sent to the target base station by the MME.

In an embodiment, the third signaling includes the indication information indicating that the UE requesting handover is the UAV.

Figure 5:
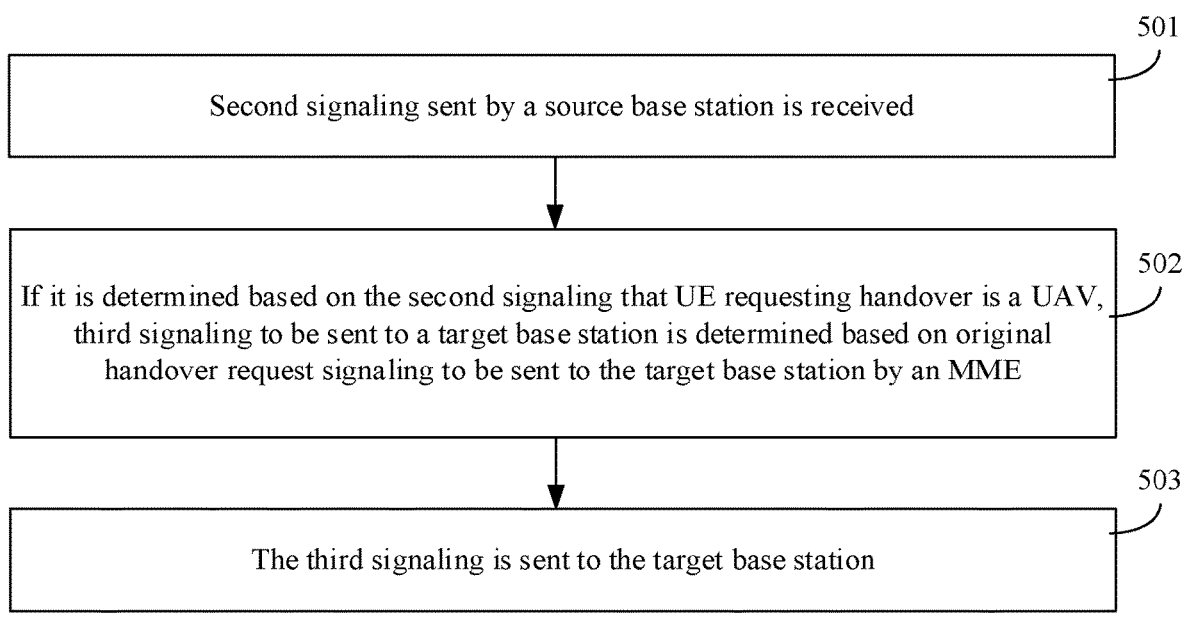
FIG. 5 is a flow chart showing a method for recognizing a UAV, according to an exemplary embodiment.

In an embodiment, the MME, after receiving the second signaling sent by the source base station, can analyze the second signaling to obtain the indication information indicating that the UE requesting handover is the UAV, and accordingly determine that it is the UAV requesting handover. Therefore, the third signaling including the indication information which indicates that the UE requesting handover is the UAV can be generated in the manner of adding an IE or an indicator bit into the handover request signaling sent to the target base station, as illustrated in FIG. 5.

In step 416, the MME sends the third signaling to the target base station.

In step 417, the target base station receives the third signaling.

In step 418, the target base station analyzes the third signaling to obtain the indication information indicating that the UE requesting handover is the UAV.

In step 419, the target base station determines based on the indication information that the UE requesting handover is the UAV.

In the embodiments, methods are provided for the source base station to indicate to the target base station that the UE requesting handover is a UAV during X2-interface-based handover or S1-interface-based handover. The target base station can recognize the UAV when the source base station requests handover, and the target base station can serve the UAV more rapidly and accurately.

FIG. 5 is a flow chart showing a method for recognizing a UAV, according to an exemplary embodiment. The method for recognizing a UAV can be applied to an MME and, as illustrated in FIG. 5, includes the following steps.

In step 501, second signaling sent by a source base station is received.

In step 502, if it is determined based on the second signaling that UE requesting handover is a UAV, third signaling to be sent to a target base station is determined based on original handover request signaling to be sent to the target base station by the MME.

In an embodiment, the third signaling includes indication information indicating that the UE requesting handover is the UAV.

In an embodiment, the MME can determine based on the indication information in the second signaling that the UE requesting handover is the UAV, and further add the indication information indicating that the UE requesting handover is the UAV into the original handover request signaling.

In an embodiment, the third signaling can be determined in the following three manners.

In a first manner, a UAV authorized IE is added into the original handover request signaling to obtain the third signaling, and the UAV authorized IE is configured to indicate that the UE requesting handover is the UAV.

In a second manner, a new UAV capability indicator bit is added into UE's supported network capability signaling in original handover preparation signaling to obtain the third signaling. The UAV capability indicator bit is configured to indicate that the UE requesting handover is the UAV, and the handover preparation signaling is in a source to target transparent container IE of the handover request signaling.

In a third manner, a new UE type IE is added into a UE context IE in the original handover request signaling to obtain the third signaling, and the UE type IE is configured to indicate that the UE requesting handover is the UAV.

In step 503, the third signaling is sent to the target base station.

In an exemplary scenario, as illustrated in FIG. 1C, there are provided a source base station 10, a UAV 20, a target base station 30 and an MME 40. After the source base station 10 determines the target base station 30 for handover and an S1-interface-based handover mode based on a measurement report of the UAV 20, the source base station 10 can generate second signaling including indication information which indicates that UE requesting handover is the UAV based on original handover request signaling, and send it to the MME 40. The MME 40 transmits the indication information indicating that the UE requesting handover is the UAV to the target base station 30 through signaling, and the target base station 30 can configure service meeting a requirement of the UAV for the UAV 20 based on the indication information.

In the embodiment, through step 501 to step 503, transmission of the indication information indicating that the UE requesting handover is the UAV to the target base station by the MME through the signaling is implemented, so as to solve the problem in the related art that the target base station may not recognize the UAV during handover of the UAV and then may not provide service meeting a UAV's requirement.

Figure 6:
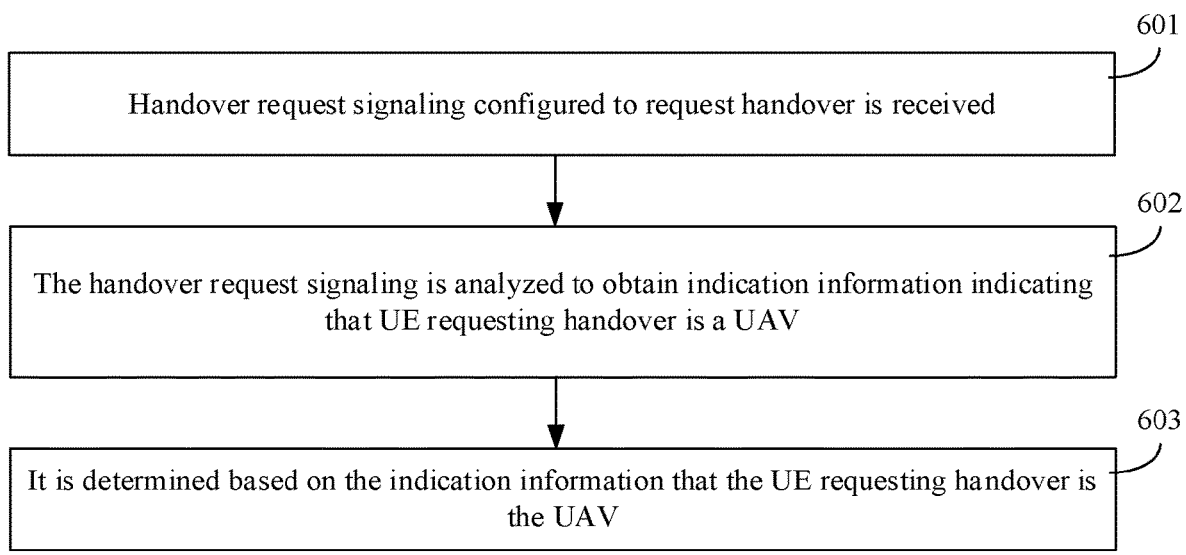
FIG. 6 is a flow chart showing a method for recognizing a UAV, according to an exemplary embodiment.

FIG. 6 is a flow chart showing a method for recognizing a UAV, according to an exemplary embodiment. The method for recognizing a UAV can be applied to a target base station. As illustrated in FIG. 6, the method for recognizing a UAV includes the following steps.

In step 601, handover request signaling configured to request handover is received.

In an embodiment, in case of X2-interface-based handover, the target base station can receive second signaling sent by a source base station, and the second signaling is signaling obtained by adding a new IE in original handover request signaling or adding an indicator bit into UE-EUTRA-capability signaling to indicate that requesting UE is a UAV.

In an embodiment, in case of S1-interface-based handover, the target base station can receive third signaling sent by an MME, and the third signaling is signaling obtained in a manner that the MME adds the new IE in the original handover request signaling or adds the indicator bit into the UE-EUTRA-capability signaling to indicate that the requesting UE is the UAV In step 602, the handover request signaling is analyzed to obtain indication information indicating that UE requesting handover is a UAV.

In step 603, it is determined based on the indication information that the UE requesting handover is the UAV.

In an exemplary scenario, as illustrated in FIG. 1B, there are provided a source base station 10, a UAV 20 and a target base station 30. After the source base station 10 determines the target base station 30 for handover based on a measurement report of the UAV 20, the source base station 10 can generate second signaling including indication information which indicates that UE requesting handover is the UAV based on original handover request signaling, and send it to the target base station 30. In such a manner, the source base station 10 transmits the indication information indicating that the UE requesting handover is the UAV to the target base station 30, and the target base station 30 can configure service meeting a UAV's requirement for the UAV 20 based on the indication information.

In another exemplary scenario, as illustrated in FIG. 1C, there are provided a source base station 10, a UAV 20, a target base station 30 and an MME 40. After the source base station 10 determines the target base station 30 for handover based on a measurement report of the UAV 20, the source base station 10 can generate second signaling including indication information which indicates that UE requesting handover is the UAV based on original handover request signaling, and send it to the MME 40. In such a manner, the source base station 10 transmits the indication information indicating that the UE requesting handover is the UAV to the MME 40, then the MME 40 transmits the indication information indicating that the UE requesting handover is the UAV to the target base station 30 through signaling, and the target base station 30 can configure service meeting a UAV's requirement for the UAV 20 based on the indication information.

In the embodiment, through step 601 to step 603, the target base station can recognize whether the UE requesting handover is the UAV based on the received handover request signaling so as to configure a service meeting a UAV's requirement for the UAV 20.

Figure 7:
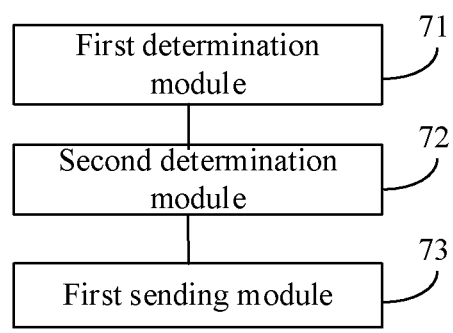
FIG. 7 is a block diagram of an apparatus for recognizing a UAV, according to an exemplary embodiment.

FIG. 7 is a block diagram of an apparatus for recognizing a UAV, according to an exemplary embodiment. The apparatus is applied to a source base station. As illustrated in FIG. 7, the apparatus for recognizing a UAV includes: a first determination module 71, configured to determine a target base station to which UE is to be handed over and a handover mode of the UE handing over from the source base station to the target base station based on a measurement report reported by the UE; a second determination module 72, configured to determine second signaling based on first signaling corresponding to the handover mode determined by the first determination module 71, wherein the first signaling is signaling sent by the source base station for requesting handover, and the second signaling includes indication information indicating that the UE requesting handover is a UAV; and a first sending module 73, configured to send the second signaling determined by the second determination module 72.

Figure 8:
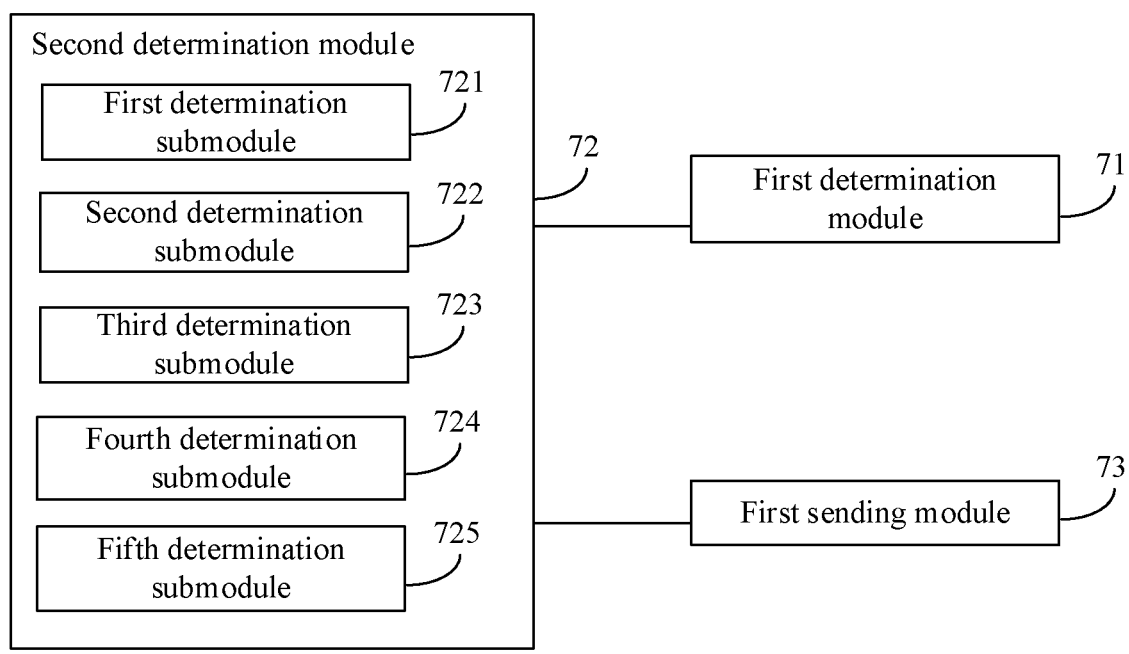
FIG. 8 is a block diagram of an apparatus for recognizing a UAV, according to an exemplary embodiment.

FIG. 8 is a block diagram of another apparatus for recognizing a UAV, according to an exemplary embodiment. As illustrated in FIG. 8, based on the embodiment illustrated in FIG. 7, the second determination module 72 includes: a first determination submodule 721, configured to, if the handover mode is X2-interface-based handover, add a UAV authorized IE into original handover request signaling to obtain the second signaling, the UAV authorized IE being configured to indicate that the UE requesting handover is the UAV.

In an embodiment, the second determination module 72 includes: a second determination submodule 722, configured to, if the handover mode is X2-interface-based handover, add a new UAV capability indicator bit into UE-EUTRA-capability signaling in original handover preparation signaling to obtain the second signaling. The UAV capability indicator bit is configured to indicate that the UE requesting handover is the UAV, and the handover preparation signaling is in an RRC context IE of the handover request signaling.

In an embodiment, the second determination module 72 includes: a third determination submodule 723, configured to, if the handover mode is X2-interface-based handover, add a new UE type IE into a UE context IE in original handover request signaling to obtain second signaling, and the UE type IE is configured to indicate that the UE requesting handover is the UAV.

In an embodiment, the second determination module 72 includes: a fourth determination submodule 724, configured to, if the handover mode is S1-interface-based handover, add a UE type IE into original handover required signaling to obtain second signaling, and the UE type IE is configured to indicate that the UE requesting handover is the UAV.

In an embodiment, the second determination module 72 includes: a fifth determination submodule 725, configured to, if the handover mode is S1-interface-based handover, add a new UAV capability indicator bit into UE-EUTRA-capability signaling in original handover preparation signaling to obtain second signaling. The UAV capability indicator bit is configured to indicate that the UE requesting handover is the UAV, and the handover preparation signaling is in a source to target transparent container IE of the handover required signaling.

Figure 9:
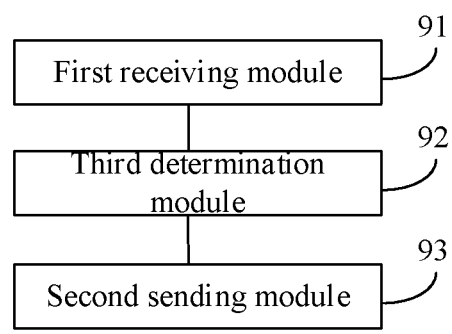
FIG. 9 is a block diagram of an apparatus for recognizing a UAV, according to an exemplary embodiment.

FIG. 9 is a block diagram of an apparatus for recognizing a UAV, according to an exemplary embodiment. The apparatus is applied to an MME. As illustrated in FIG. 9, the apparatus for recognizing a UAV includes: a first receiving module 91, configured to receive second signaling sent by a source base station; a third determination module 92, configured to, if it is determined based on the second signaling received by the first receiving module 91 that UE requesting handover is a UAV, determine third signaling to be sent to a target base station based on original handover request signaling to be sent to the target base station by the MME, and the third signaling including indication information indicating that the UE requesting handover is the UAV; and a second sending module 93, configured to send the third signaling to the target base station.

Figure 10:
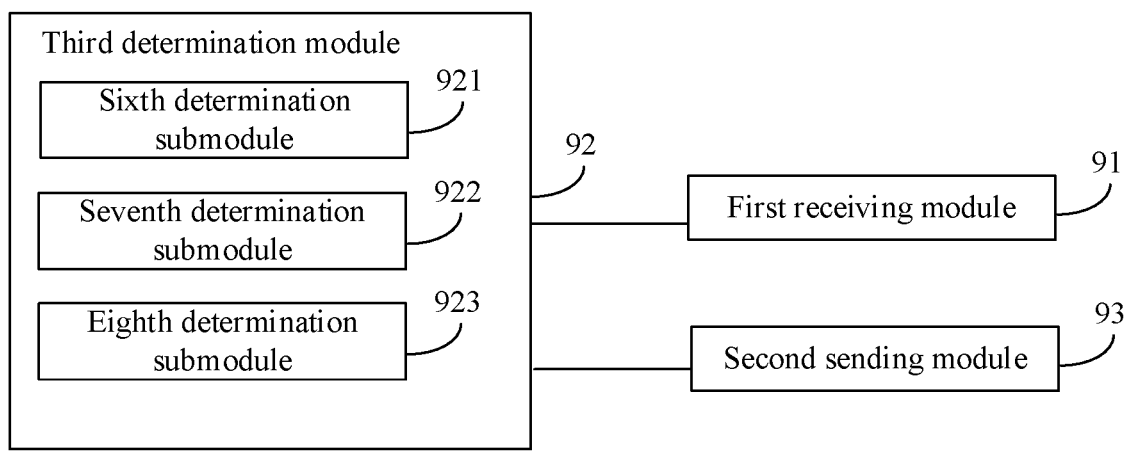
FIG. 10 is a block diagram of an apparatus for recognizing a UAV, according to an exemplary embodiment.

FIG. 10 is a block diagram of an apparatus for recognizing a UAV, according to an exemplary embodiment. As illustrated in FIG. 10, based on the embodiment illustrated in FIG. 9, the third determination module 92 includes: a sixth determination submodule 921, configured to add a UAV authorized IE into the original handover request signaling to obtain the third signaling, the UAV authorized IE being configured to indicate that the UE requesting handover is the UAV.

In an embodiment, the third determination module 92 includes: a seventh determination submodule 922, configured to add a new UAV capability indicator bit into UE-EUTRA-capability signaling in original handover preparation signaling to obtain the third signaling. The UAV capability indicator bit is configured to indicate that the UE requesting handover is the UAV, and the handover preparation signaling is in a source to target transparent container IE of the handover request signaling.

In an embodiment, the third determination module 92 includes: an eighth determination submodule 923, configured to add a new UE type IE into a UE context IE in the original handover request signaling to obtain the third signaling, the UE type IE being configured to indicate that the UE requesting handover is the UAV.

Figure 11:
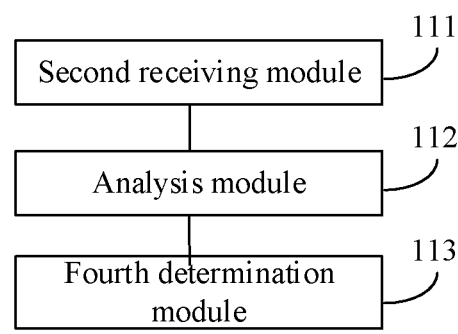
FIG. 11 is a block diagram of an apparatus for recognizing a UAV, according to an exemplary embodiment.

FIG. 11 is a block diagram of an apparatus for recognizing a UAV, according to an exemplary embodiment. The apparatus is applied to a target base station. As illustrated in FIG. 11, the apparatus for recognizing a UAV includes: a second receiving module 111, configured to receive handover request signaling configured to request handover; an analysis module 112, configured to analyze the handover request signaling to obtain indication information indicating that UE requesting handover is a UAV; and a fourth determination module 113, configured to determine based on the indication information that the UE requesting handover is the UAV.

Figure 12:
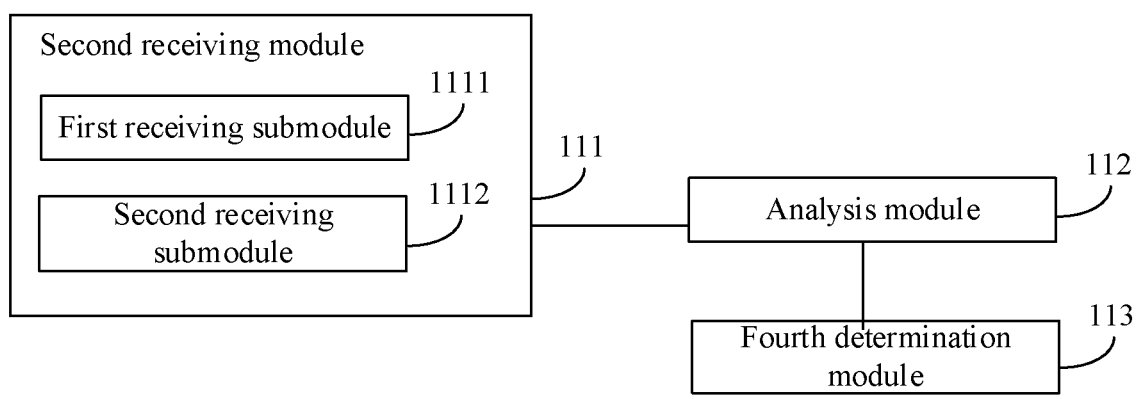
FIG. 12 is a block diagram of an apparatus for recognizing a UAV, according to an exemplary embodiment.

FIG. 12 is a block diagram of an apparatus for recognizing a UAV, according to an exemplary embodiment. As illustrated in FIG. 12, based on the embodiment illustrated in FIG. 11, the second receiving module 111 includes: a first receiving submodule 1111, configured to receive second signaling sent by a source base station, the second signaling including the indication information indicating that the UE requesting handover is the UAV; or a second receiving submodule 1112, configured to receive third signaling sent by an MME, the third signaling including the indication information indicating that the UE requesting handover is the UAV.

With respect to the apparatus in the above embodiments, the specific manners for performing operations by individual modules therein have been described in detail in the method embodiments, which will not be repeated herein.

Figure 13:
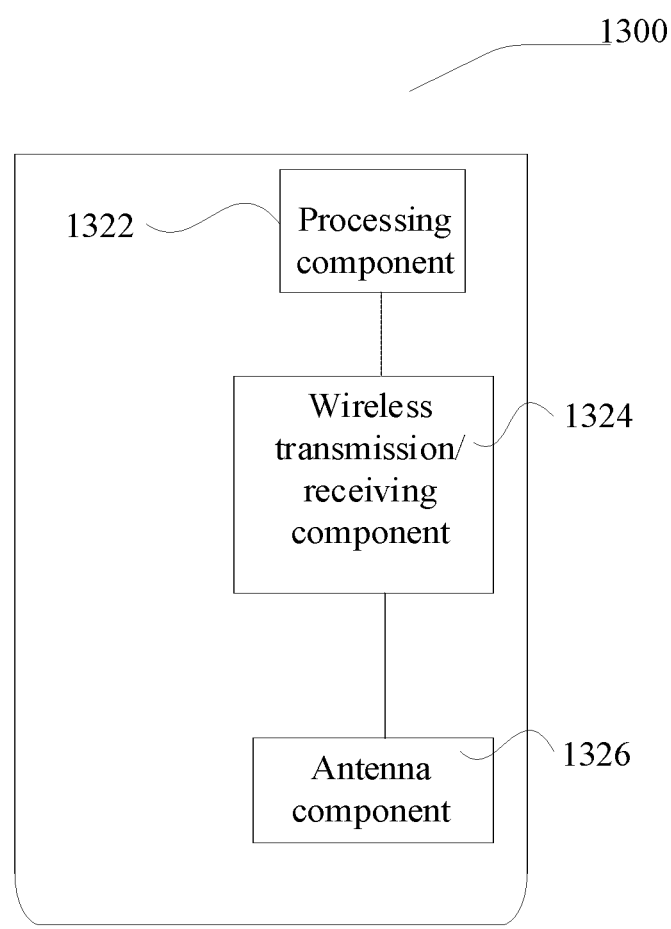
FIG. 13 is a block diagram of an apparatus for recognizing a UAV, according to an exemplary embodiment.

FIG. 13 is a block diagram of an apparatus 1300 applied to UAV recognition, according to an exemplary embodiment. The apparatus 1300 can be provided as a base station or an MME. Referring to FIG. 13, the apparatus 1300 includes a processing component 1322, a wireless transmission/receiving component 1324, an antenna component 1326 and a wireless interface-specific signal processing part, and the processing component 1322 can further include one or more processors configured to perform the above described methods for recognizing a UAV.

In an exemplary embodiment, there is also provided a non-transitory computer-readable storage medium including an instruction, and the instruction can be executed by the processing component 1322 of the apparatus 1300 to implement the above described methods. For example, the non-transitory computer-readable storage medium can be a Read-Only Memory (ROM), a Random Access Memory (RAM), a Compact Disc Read-Only Memory (CD-ROM), a magnetic tape, a floppy disc, an optical data storage device and the like.

Other implementation solutions of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for recognizing an unmanned aerial vehicle (UAV), applied to a source base station, comprising:
   determining a target base station to which user equipment (UE) is to be handed over and a handover mode of the UE based on a measurement report reported by the UE, wherein the handover mode includes X2-interface-based handover and S1-interface-based handover;
   determining second signaling based on first signaling corresponding to the handover mode, the first signaling being signaling for requesting handover sent by the source base station, and the second signaling including indication information indicating that the UE requesting handover is a UAV; and
   sending the second signaling to the target base station in response to the handover mode being the X2-interface-based handover, and sending the second signaling to a Mobility Management Entity (MME) in response to the handover mode being the S1-interface-based handover;
   wherein when the handover mode is the X2-interface-based handover, the first signaling is original handover request signaling, and the determining the second signaling based on the first signaling corresponding to the handover mode comprises:
   adding a new UAV capability indicator bit into the UE's supported network capability signaling in original handover preparation signaling to obtain the second signaling, wherein the UAV capability indicator bit is configured to indicate that the UE requesting handover is the UAV, the handover preparation signaling is in a Radio Resource Control (RRC) context IE of the original handover request signaling, and the second signaling is a handover request signaling configured to request to handover the UE to the target base station.

2. The method of claim 1, wherein the first signaling is the original handover request signaling, and the determining the second signaling based on the first signaling corresponding to the handover mode further comprises:
   adding, an information element (IE) authorized by the UE into the original handover request signaling to obtain the second signaling, the IE authorized by the UE being configured to indicate that the UE requesting handover is the UAV.

3. The method of claim 1, wherein the first signaling is the original handover request signaling, and the determining the second signaling based on the first signaling corresponding to the handover mode further comprises:
   adding a new UE type IE into a UE context IE in the original handover request signaling to obtain the second signaling, the UE type IE being configured to indicate that the UE requesting handover is the UAV.

4. The method of claim 1, wherein when the handover mode is the S1-interface-based handover, the first signaling is original handover required signaling, and the determining the second signaling based on the first signaling corresponding to the handover mode comprises:
   adding a UE type IE into the original handover required signaling to obtain the second signaling, the UE type IE being configured to indicate that the UE requesting handover is the UAV.

5. The method of claim 1, wherein when the handover mode is the S1-interface-based handover, the first signaling is original handover required signaling, and the determining the second signaling based on the first signaling corresponding to the handover mode comprises:
   adding a new UAV capability indicator bit into the UE's supported network capability signaling in original handover preparation signaling to obtain the second signaling;
   wherein the UAV capability indicator bit is configured to indicate that the UE requesting handover is the UAV, and the handover preparation signaling is in a source to target transparent container IE of the original handover required signaling.

6. A method for recognizing an unmanned aerial vehicle (UAV), applied to a Mobility Management Entity (MME), comprising:
   receiving second signaling sent by a source base station, wherein the second signaling is determined based on first signaling corresponding to a handover mode, and the handover mode includes X2-interface-based handover and S1-interface-based handover;
   determining, when it is determined based on the second signaling that user equipment (UE) requesting handover is a UAV, third signaling to be sent to a target base station based on original handover request signaling to be sent to the target base station by the MME, wherein the third signaling includes indication information indicating that the UE requesting handover is the UAV; and
   sending the third signaling to the target base station;

wherein the determining the third signaling to be sent to the target base station based on the original handover request signaling to be sent to the target base station by the MME comprises:
adding a new UAV capability indicator bit into the UE's supported network capability signaling in original handover preparation signaling to obtain the third signaling, wherein the UAV capability indicator bit is configured to indicate that the UE requesting handover is the UAV, the handover preparation signaling is in a source to target transparent container IE of the original handover request signaling, and the third signaling is a handover request signaling configured to request to handover the UE to the target base station.

7. The method of claim 6, wherein the determining the third signaling to be sent to the target base station based on the original handover request signaling to be sent to the target base station by the MME further comprises:
adding an information element (IE) authorized by the UE into the original handover request signaling to obtain the third signaling, the IE authorized by the UE being configured to indicate that the UE requesting handover is the UAV.

8. The method of claim 6, wherein the determining the third signaling to be sent to the target base station based on the original handover request signaling to be sent to the target base station by the MME further comprises:
adding a new UE type IE into a UE context IE in the original handover request signaling to obtain the third signaling, the UE type IE being configured to indicate that the UE requesting handover is the UAV.

9. An apparatus for recognizing an unmanned aerial vehicle (UAV), applied to a source base station, comprising:
a processor; and
a memory for storing instructions executable by the processor;
wherein the processor is configured to:
determine a target base station to which user equipment (UE) is to be handed over and a handover mode of the UE based on a measurement report reported by the UE, wherein the handover mode includes X2-interface-based handover and S1-interface-based handover;
determine second signaling based on first signaling corresponding to the determined handover mode, wherein the first signaling is signaling for requesting handover sent by the source base station, and the second signaling includes indication information indicating that the UE requesting handover is a UAV; and
send the determined second signaling to a target base station in response to the handover mode being the X2-interface-based handover, and send the determined second signaling to a Mobility Management Entity (MME) in response to the handover mode being the S1-interface-based handover;
wherein when the handover mode is the X2-interface-based handover, the first signaling is original handover request signaling, and the processor is further configured to:
add a new UAV capability indicator bit into the UE's supported network capability signaling in original handover preparation signaling to obtain the second signaling, wherein the UAV capability indicator bit is configured to indicate that the UE requesting handover is the UAV, the handover preparation signaling is in a Radio Resource Control (RRC) context IE of the original handover request signaling, and the second signaling is a handover request signaling configured to request to handover the UE to the target base station.

10. The apparatus of claim 9, wherein the first signaling is the original handover request signaling, and the processor is further configured to:
add an information element (IE) authorized by the UE into the original handover request signaling to obtain the second signaling, wherein the IE authorized by the UE is configured to indicate that the UE requesting handover is the UAV.

11. The apparatus of claim 9, wherein the first signaling is the original handover request signaling, and the processor is further configured to:
add a new UE type IE into a UE context IE in the original handover request signaling to obtain the second signaling, wherein the UE type IE is configured to indicate that the UE requesting handover is the UAV.

12. The apparatus of claim 9, wherein when the handover mode is the S1-interface-based handover, the first signaling is original handover required signaling, and the processor is further configured to:
add a UE type IE into the original handover request required signaling to obtain the second signaling, wherein the UE type IE is configured to indicate that the UE requesting handover is the UAV.

13. The apparatus of claim 9, wherein when the handover mode is the S1-interface-based handover, the first signaling is original handover required signaling, and the processor is further configured to:
add a new UAV capability indicator bit into the UE's supported network capability signaling in original handover preparation signaling to obtain the second signaling;
wherein the UAV capability indicator bit is configured to indicate that the UE requesting handover is the UAV, and the handover preparation signaling is in a source to target transparent container IE of the original handover required signaling.

14. An apparatus for recognizing an unmanned aerial vehicle (UAV), applied to a Mobility Management Entity (MME), comprising:
a processor; and
a memory for storing instructions executable by the processor;
wherein the processor is configured to:
receive second signaling sent by a source base station, wherein the second signaling is determined based on first signaling corresponding to a handover mode, and the handover mode includes X2-interface-based handover and S1-interface-based handover;
when it is determined based on the received second signaling that user equipment (UE) requesting handover is a UAV, determine third signaling to be sent to a target base station based on original handover request signaling to be sent to the target base station by the MME, wherein the third signaling includes indication information indicating that the UE requesting handover is the UAV; and
send the third signaling to the target base station;
wherein in determining the third signaling to be sent to the target base station based on the original handover request signaling to be sent to the target base station by the MME, the processor is further configured to:
add a new UAV capability indicator bit into the UE's supported network capability signaling in original handover preparation signaling to obtain the third signaling, wherein the UAV capability indicator bit is configured to indicate that the UE requesting handover is the UAV, the handover preparation signaling is in a source to target transparent container IE of the original handover request signaling, and the third signaling is a handover request signaling configured to request to handover the UE to the target base station.

15. The apparatus of claim 14, wherein the processor is further configured to:
add an information element (IE) authorized by the UE into the original handover request signaling to obtain the third signaling, wherein the IE authorized by the UE is configured to indicate that the UE requesting handover is the UAV.

16. The apparatus of claim 14, wherein the processor is further configured to:
add a new UE type IE into a UE context IE in the original handover request signaling to obtain the third signaling, wherein the UE type IE is configured to indicate that the UE requesting handover is the UAV.

* * * * *